US009228452B2

(12) United States Patent
Terdalkar et al.

(10) Patent No.: US 9,228,452 B2
(45) Date of Patent: Jan. 5, 2016

(54) SYSTEM AND METHOD FOR AUXILIARY FLUID CIRCUIT HEATING OR COOLING OF A SUPERHEATER DURING STARTUP AND SHUTDOWN OPERATIONS

(71) Applicant: ALSTOM Technology Ltd, Baden (CH)

(72) Inventors: Rahul J. Terdalkar, Bloomfield, CT (US); Wesley P. Bauver, Granville, MA (US); Thomas W. Sambor, Granby, MA (US)

(73) Assignee: ALSTOM Technology Ltd, Baden (CH)

( * ) Notice: Subject to any disclaimer, the term of this patent is extended or adjusted under 35 U.S.C. 154(b) by 24 days.

(21) Appl. No.: 13/774,103

(22) Filed: Feb. 22, 2013

(65) Prior Publication Data

US 2014/0238019 A1    Aug. 28, 2014

(51) Int. Cl.
*F03G 6/06* (2006.01)
*F01K 13/02* (2006.01)
*F22B 1/00* (2006.01)
*F22B 35/04* (2006.01)

(52) U.S. Cl.
CPC ............... *F01K 13/02* (2013.01); *F03G 6/065* (2013.01); *F22B 1/006* (2013.01); *F22B 35/04* (2013.01); *Y02E 10/46* (2013.01)

(58) Field of Classification Search
CPC ....... F01K 13/02; F01K 13/025; F03G 6/003; F03G 6/005; F03G 6/06; F03G 6/065; F03G 6/067; Y02B 10/20–10/24; Y02E 10/40; Y02E 10/41; Y02E 10/46; Y02E 10/465; Y02E 10/47

USPC ......... 60/641.8, 641.11, 641.14, 641.15, 646, 60/653, 657; 126/569–714
See application file for complete search history.

(56) References Cited

U.S. PATENT DOCUMENTS 4,438,630 A * 3/1984 Rowe .............................. 60/676
4,984,624 A    1/1991 Klaren
(Continued)

FOREIGN PATENT DOCUMENTS

DE    102011075929 A1    11/2012
WO    2011/140021 A1    11/2011

OTHER PUBLICATIONS

Search Report issued from European Patent Office dated Sep. 4, 2015 for EP Application No. 14153756.3.

*Primary Examiner* — Thomas Denion
*Assistant Examiner* — Laert Dounis

(57) ABSTRACT

System and method for pre-startup or post-shutdown preparation for such power plants are disclosed which are subject to frequent startups and shutdowns, such as a solar operated power plant. The system and method introduces an auxiliary fluid flow to be circulated in an opposite direction to a direction of normal working fluid flow responsible for producing electricity. That is, if the working fluid flow in a first direction for operating the power plant, than the auxiliary fluid flows in a second direction, opposite to the first direction. The auxiliary fluid flows in the second direction for a predetermined time and at a predetermined conditions through a plurality of superheater panel arrangements of solar receiver former to activation of the working fluid circuit, as pre-startup preparation of the power plant, and after cessation of the working fluid circuit, as post-shutdown preparation of the power plant, to attain predetermined conditions in the superheater.

10 Claims, 4 Drawing Sheets

(56) References Cited

U.S. PATENT DOCUMENTS

| | | |
|---|---|---|
| 7,340,899 B1 | 3/2008 | Rubak et al. |
| 8,517,008 B2 * | 8/2013 | Plotkin et al. ............... 126/663 |
| 8,763,397 B1 * | 7/2014 | Meduri et al. ............... 60/641.8 |
| 2009/0261591 A1 * | 10/2009 | Palkes et al. ............... 290/52 |
| 2011/0088396 A1 * | 4/2011 | Katz et al. ............... 60/641.8 |

* cited by examiner

SYSTEM AND METHOD FOR AUXILIARY FLUID CIRCUIT HEATING OR COOLING OF A SUPERHEATER DURING STARTUP AND SHUTDOWN OPERATIONS

BACKGROUND

1. Field of Endeavor

The present disclosure relates to power plants or steam generators, and, more particularly, startup and shutdown preparations of power plants or stream generators or boilers, specifically to those power plants, which are subject to frequent shutdowns and startups.

2. Brief Description of the Related Art

Certain steam generator or boilers used in power plants are subject to frequent shutdown and startup. For example, concentrated solar power plants that have dependability on the solar energy to operate during daytime while shutting down in night (referred as shutdown period).

Such concentrated solar power plant uses solar boilers for producing steam to operate steam turbine in turn producing electricity by utilizing generators. Generally, a solar boiler may, apart from various other components, include an evaporator section and high temperature components, such as superheater section or reheater. The evaporator section produces steam and supplies it to the high temperature components, such as the superheater section, which superheat the steam to supply superheated steam for operating the steam turbine. Each of the evaporator or superheater section includes various fluidically connected panels having various fluid-carrying tubes vertically arranged between respective top and bottom horizontal headers, which are thick walled and generally insulated. These panels are heated by focusing sunrays thereon, in turn heating the fluid to be utilized for producing electricity.

During normal operation, the high temperature components, such as the panels of the superheater section, reach to its maximum temperature, and during the shutdown period it loses heat and reaches at relatively lower or higher residual temperature than that required for starting up the power plant in the morning. Specifically, the tubes in the superheater panels reach ambient temperatures as they lose heat to ambient air. Unlike the superheater tubes, the thick walled and insulated headers or manifolds of the superheater may not lose heat to ambient air. Therefore, during shutdown, the headers or manifolds are at relative lower or higher residual temperature than required for startup, and are generally at higher temperature as compared to the ambient temperature tubes during shutdown. During daytime, while normal operation of the power plant, the temperature of steam and the superheater panels increase from the superheater component inlet sections (upstream) to superheater outlet sections (downstream), keeping the superheater outlet sections at higher temperature, and the superheater inlet sections at relatively lower. Therefore, even after losing some heat during the shutdown period, the superheater upstream components remain at relatively lower residual temperature as compared to the superheater downstream components. At such condition, starting up of the power plant without any preparation may lead various problems such as fatigue damage of superheater panels, particularly headers and manifolds, due to substantial difference between temperature of steam coming from the evaporator section and temperature of the headers and tubes of the superheater panels. This temperature difference between the steam and header may generate through wall temperature gradients in the header causing thermal stress.

Accordingly, there exists a need to balance the thermal stress and improve the fatigue life of superheater upstream and downstream components of the superheater to increase overall life of the power plants.

SUMMARY

The present disclosure describes a system and a method for pre-startup and post-shutdown preparations of a power plant that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a system and a method, which may balance the thermal stress and improve the fatigue life of superheater upstream and downstream components of the superheater to increase overall life of the power plants or steam generator. Another object of the present disclosure is to describe a system and a method, which are convenient to use and economical. Various other objects and features of the present disclosure will be apparent from the following detailed description and claims.

The above noted and other objects, in one aspect, may be achieved by a system for at least one of pre-startup and post-shutdown preparations of a power plant. In other aspects, above noted and other objects, may be achieved by a method for at least one of pre-startup and post-shutdown preparations of a power plant. Examples of the power plants, where such system and method may be utilized are those, which are subject to frequent startups and shutdowns, such as solar operated power plants. While the disclosure will be described in conjunction to the solar operated power plants for the purpose of better understanding, the scope of the disclosure will extend to all such power plants that are subject to frequent startups and shutdowns.

According to the above aspects of the present disclosure, a system for at least one of pre-startup and post-shutdown preparations of a solar operated power plant is disclosed. The solar operated power plant includes a solar receiver to heat a working fluid flowing therethrough. The solar receiver having a superheater section comprising a plurality of superheater panel arrangements. The solar operated power plant also includes at least one of a turbine and a heat exchanger, wherein the turbine is operable on the working fluid received from the solar receiver flowing through the plurality of superheater panel arrangements, and the heat exchanger is utilized to transfer the heat of the working fluid. Further, the system includes a working fluid circuit and an auxiliary fluid circuit. The working fluid circuit is capable of enabling the working fluid flow in a first direction, from the solar receiver to the at least one of the turbine and the heat exchanger, through the plurality of superheater panel arrangements. The auxiliary fluid circuit is capable of enabling an auxiliary fluid flow for a predetermined time and at predetermined parameters in a second direction, opposite to the first direction, through the plurality of superheater panel arrangements to attain predetermined conditions thereof. The auxiliary fluid circuit is being activated for the predetermined time former to activation of the working fluid circuit, as the pre-startup preparation of the solar operated power plant. The auxiliary fluid circuit is being activated for the predetermined time after cessation of the working fluid as the post-shutdown operation of the solar power plant.

The predetermined parameters of the auxiliary fluid may be a variable of at least one of a predetermined temperature, a predetermined pressure and a predetermined flow rate of the auxiliary fluid. The at least one predetermined parameters of the auxiliary fluid flow is varied to attained desired temperature distribution along the plurality of superheater panel arrangements to minimize thermal stress thereon.

As pre-startup preparation of the solar operated power plant, former to activation of the working fluid circuit for starting up the solar operated power plant, the predetermined temperature of the auxiliary fluid flow may be higher than or equal to temperature of downstream sections of the plurality of superheater panel arrangements to heat the plurality of superheater panel arrangements. Further, as post-shutdown preparation, after cessation of the working fluid circuit for shutting down the solar operated power plant, the predetermined temperature of the auxiliary fluid flow is lower than or equal to temperature of downstream sections of the plurality of superheater panel arrangements to cool the plurality of superheater panel arrangements.

The solar receiver also includes an evaporator section having a plurality of evaporator panel arrangements adapted to generate the working fluid to supply to the superheater section. The system may further include a reheater section to reheat the working fluid, and an economizer section to increase the temperature of the working fluid.

Further, each superheater panel arrangement includes bottom and top horizontal or substantially sloped headers and a bundle of parallel substantially vertical tubes disposed between the bottom and top headers. Any one of the top or bottom header of one superheater panel arrangement, and any one of the top or bottom header of an adjacent superheater panel arrangement are fluidically coupled to configure the plurality of superheater panel arrangements for the working fluid flow in the first direction and the auxiliary fluid flow in the second direction.

The plurality of superheater panel arrangements includes first and last superheater panel arrangements; and may also alternatively include one or more intermediate superheater panel arrangements disposed between the first and last superheater panel arrangements and fluidically coupled to each other. One of the top or bottom headers of the first superheater panel arrangement coupled to the evaporator section of the solar receiver to receive working fluid therefrom, and one of the top or bottom headers of the last superheater panel arrangement to direct working fluid therethrough to operate the turbine, defining the first direction. Particularly, the second direction opposite to the first direction of the auxiliary fluid flow is defined from an outlet of the header of the last superheater panel arrangement to an inlet of the header of the first superheater panel arrangement flowing though the one or more intermediate superheater panel arrangements.

In one embodiment, the system may further include at least one control device to control the predetermined parameters of the auxiliary fluid flow. The system may also include a drainage mechanism to drain the auxiliary fluid flow exiting from the superheater section. In further embodiment, the system may further include an isolation arrangement to isolate the superheater section from the evaporator section and the at least one of the turbine and the heat exchanger.

In another aspect of the present disclosure, a method for at least one of pre-startup and post-shutdown preparations of a solar operated power plant having a solar receiver and at least one of a turbine or a heat exchanger. The solar receiver having a superheater section including a plurality of superheater panel arrangements. The method includes: circulating working fluid flow in a first direction through a working fluid circuit, the first direction defined from the solar receiver to the turbine or the heat exchanger, through the plurality of superheater panel arrangements, the working fluid from the solar receiver operates the turbine or exchange heat through the heat exchanger; and circulating an auxiliary fluid flow at predetermined parameters in a second direction, opposite to the first direction, through the plurality of superheater panel arrangements to attain predetermined condition thereof, the auxiliary fluid circuit being activated for a predetermined time former to activation of the working fluid circuit arrangement as pre-startup preparation of the solar operated power plant. The auxiliary fluid circuit is being activated for the predetermined time after cessation of the working fluid as the post-shutdown operation of the solar power plant.

The disclosure also includes a system for at least one of pre-heating and post-cooling a superheater section, having a plurality of superheater panel arrangements, of a steam generator. Such system also includes a working fluid circuit and an auxiliary fluid circuit. The working fluid circuit is capable of enabling a working fluid flow in a first direction, from a first panel arrangement to a last panel arrangement of the plurality of panel arrangements. Further, an auxiliary fluid circuit is capable of enabling an auxiliary fluid flow for a predetermined time and at predetermined parameters in a second direction, opposite to the first direction, through the plurality of superheater panel arrangements to attain predetermined condition thereof, the auxiliary fluid circuit being activated for the predetermined time former to activation of the working fluid circuit, as the pre-heating of the superheater section, and after cessation of the working fluid circuit, as the post-cooling superheater section.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION OF THE PRESENT DISCLOSURE

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," "second," "top," "bottom," and the like, herein do not denote any order, elevation or importance, but rather are used to distinguish one element from another. Further, the terms "a" and "an" herein do not denote a limitation of quantity, but rather denote the presence of at least one of the referenced item.

Figure 1:
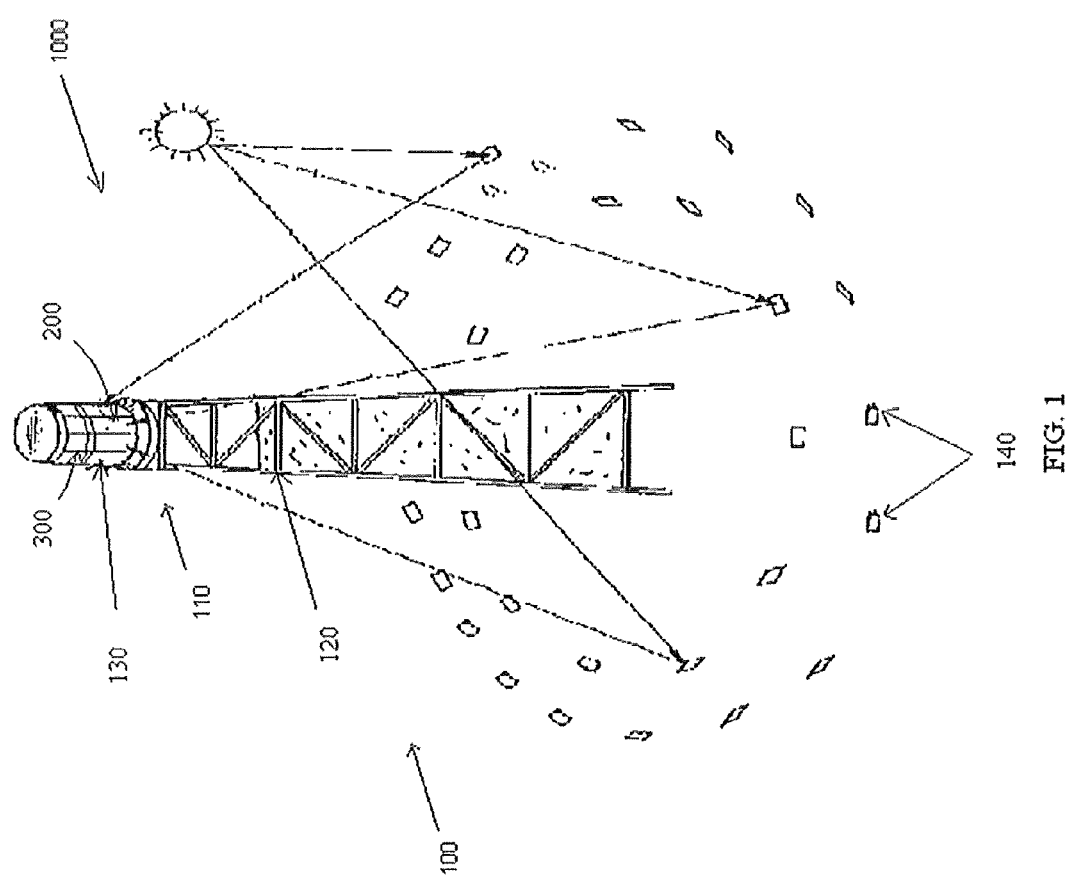
FIG. 1 illustrates an example of a solar power plant, in accordance with an exemplary embodiment of the present disclosure.
Figure 2:
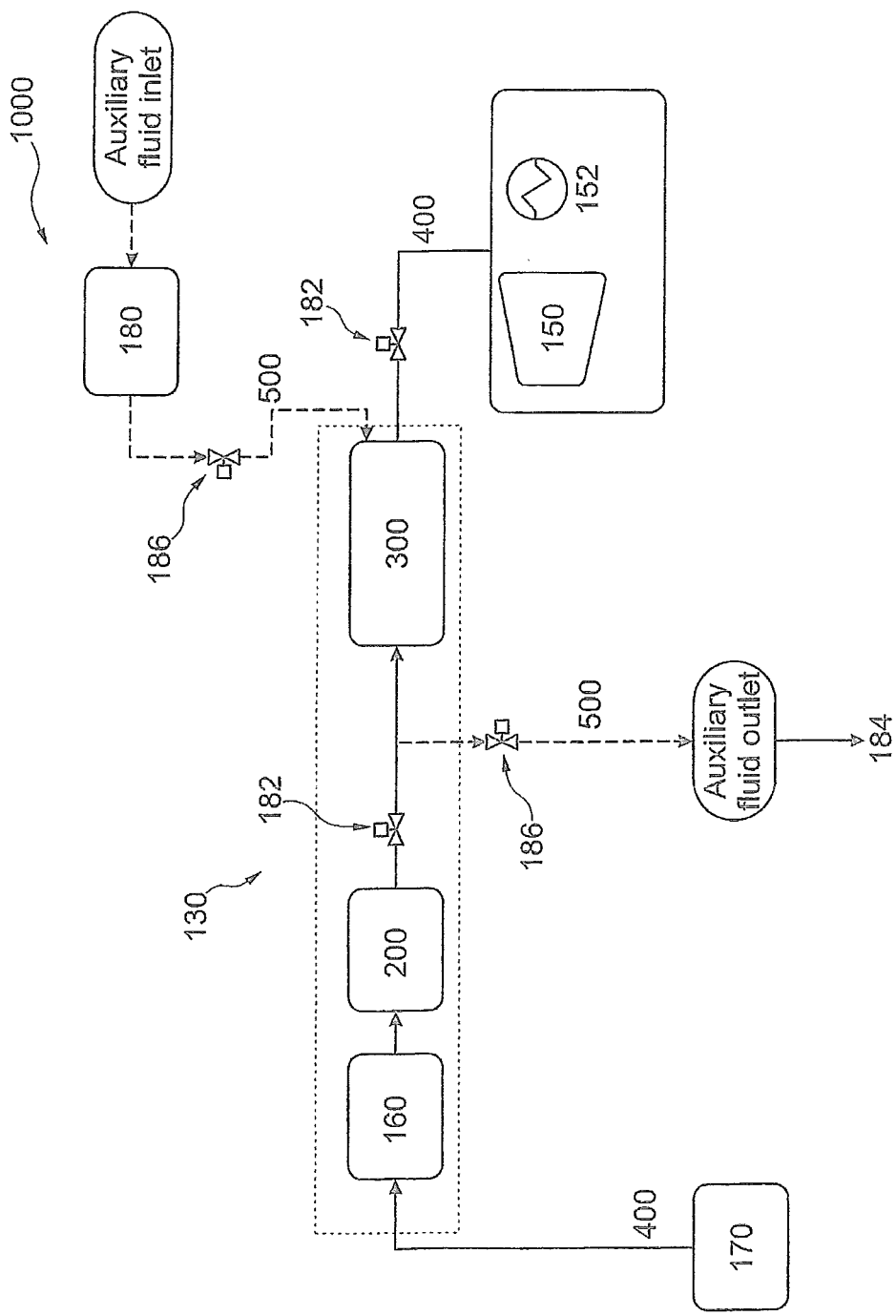
FIG. 2 illustrates a block diagram depicting a system for pre-startup preparation of the solar operated power plant of FIG. 1, in accordance with an exemplary embodiment of the present disclosure.

Referring now to FIG. 1, an example of a system 1000 for at least one of pre-startup and post-shutdown preparations of a power plant having a fluid generating source, such as a solar operated power plant set-up 100 ('power plant 100') with a solar receiver, is illustrated in accordance with an exemplary embodiment of the present disclosure. However, where the system 1000 is utilized with respect to other power plants other than the solar power plant, the solar receiver may be replaced by a steam generator. The system 1000 for the power plant 100 includes a concentrated solar tower assembly 110 having a tower structure 120 and as above mentioned a solar receiver 130 placed at top thereof, where solar rays are concentrated from a heliostat 140 for production of electricity by utilizing a turbine 150 (as shown in FIG. 2). The system may also include a heat exchanger 152 (as shown in FIG. 2) to transfer heat of the solar receiver to any other source. Specifically, the solar receiver 130 includes an evaporator section 200 and a superheater section 300, each having various tubes or tube panels (will be described in detail herein later) through which a working fluid flows for carrying the solar heat accumulated therein due to concentrated solar rays by the heliostat 140.

Figure 3:
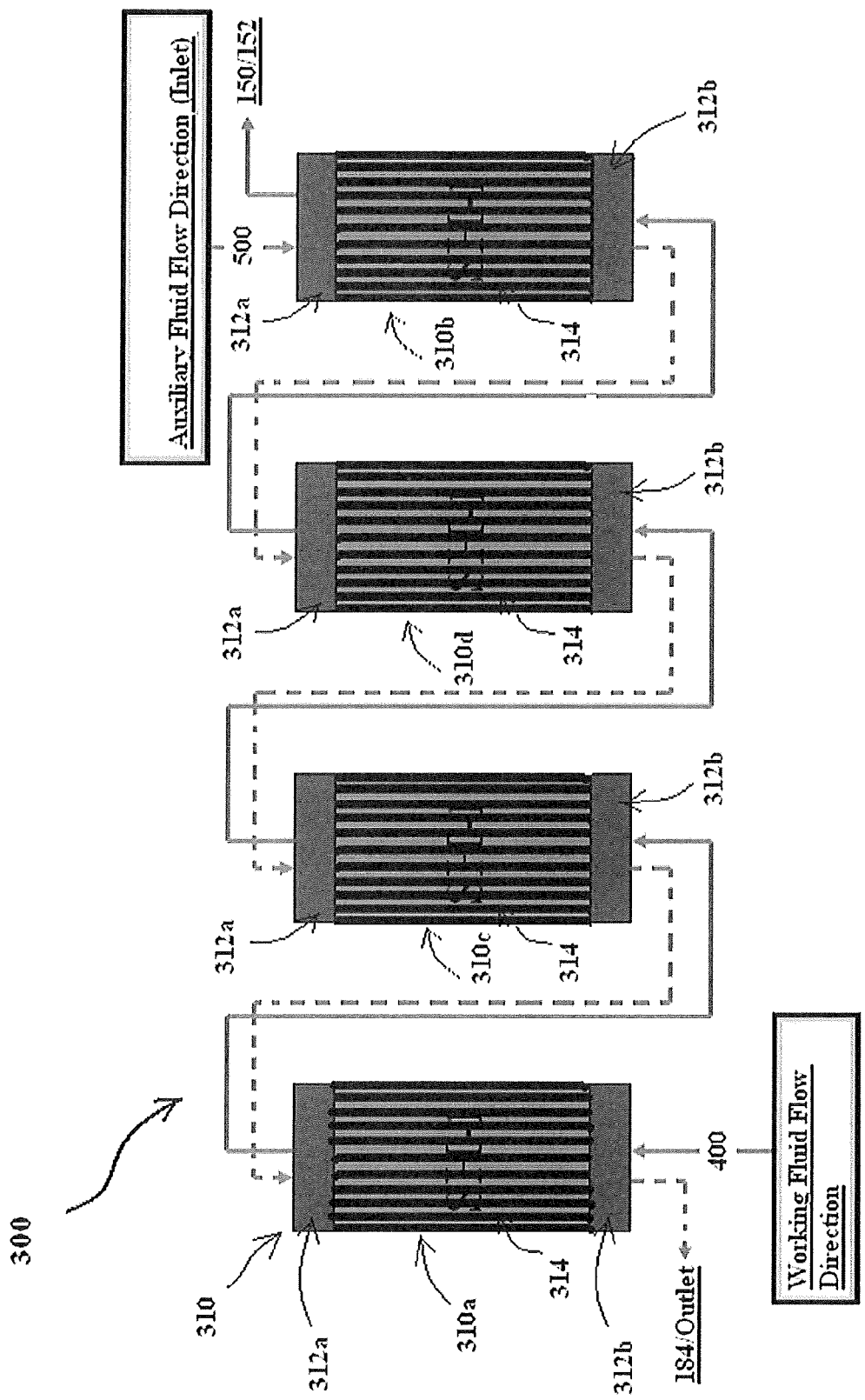
FIG. 3 illustrates a block diagram depicting panel arrangements of the system of FIG. 2, in accordance with an exemplary embodiment of the present disclosure.

In as much as the construction and arrangement of the system 1000 for the power plant 100 having the tower structure 120, the solar receiver 130 and the heliostat 140 are all well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 2 and 3, block diagrams depicting the system 1000 for pre-startup preparation of the power plant 100 of FIG. 1 that may be successfully utilized in relation to any solar operated power plants or any other power plants (other than solar) that are subject to frequent startups and shutdowns. Further, it should be understood that the tower structure 120 and the solar receiver 130 may include a variety of components for performing their assigned purpose, and only those components are shown that are relevant for the description of various embodiments of the present disclosure.

As shown in FIGS. 2 and 3, the solar receiver 130 of the system 1000 includes the evaporator section 200 configured fluidically to the superheater section 300. The solar receiver 130 receives the solar heat directed by the heliostat 140 to heat the working fluid flowing therethrough. Specifically, the evaporator section 200 is adapted to obtain the working fluid to supply to the superheater section 300. The evaporator section 200 receives feed water from a feed water supply 170 and converts thereto into steam. The steam obtained is supplied to the superheater section 300 for obtaining superheated steam. The superheated steam is supplied to the turbine 150 for producing electricity. Feed water is converted into steam and then steam into superheated steam, is collectively referred to as 'the working fluid.' Flow of the working fluid from the solar receiver 130 towards the turbine 150 defines a working fluid circuit 400, and such direction of the working fluid flow is defined as a 'first direction.' The working fluid circuit 400 and the flow of the working fluid in the first direction will be described herein in great details.

In one embodiment of the present disclosure, the system 1000 may also include a reheat section (not shown) and an economizer 160 configured to the solar receiver 130. The reheat section is capable of reheating the working fluid, for example in case of multistage turbines, to supply the heated working fluid at desired stages. Further, the economizer 160 increases the temperature of the working fluid (specifically Feed water) as per requirement. The economizer 160 supplies Feed water to the evaporator section 200 for further operations.

Each of the evaporator section 200 and the superheater section 300 includes various panel arrangements that are fluidically connected to each other. Specifically, the evaporator section 200 includes various evaporator panel arrangements fluidically connected to each other, and the superheater section 300 includes various superheater panel arrangements fluidically connected to each other (individually or jointly referred to as 'panel arrangements'). Herein for the sake of brevity the panel arrangements of the superheater section 300 will be described and the panel arrangements of the evaporator section 200 may be understood to include similar arrangements, although the connection thereof may differ from the panel arrangements of the superheater section 300.

As evident in FIG. 3, the superheater section 300 includes a plurality of superheater panel arrangements 310 ('panel arrangements 310'). The panel arrangements 310 are arranged from a first panel arrangement 310a (superheater inlet component sections) to a last panel arrangement 310b (superheater outlet component sections), having in-between one or more intermediate panel arrangements, such as panel arrangements 310c, 310d, each of which are fluidically coupled to other. As shown in FIG. 3, only four panel arrangements are shown for understanding, however, any number of panel arrangements may be included are per the industrial demands. Further, FIG. 3 is an exemplary depiction of the superheater panel arrangements 310 and is not considered to be limiting. During actual formation of the solar receiver 130, various panel arrangements 310 may be arranged in any desired manner, such as in circular manner, which may receive maximum solar energy for obtaining the working fluid.

Each of the panel arrangement 310 includes bottom and top headers 312a, 312b disposed in horizontal or slightly sloped manner, and a bundle of substantially parallel vertical tubes 314 disposed therebetween. Without departing the scope of the present disclosure, such headers of tubes may be arranged in any desired manner as per industrial demands. The top header 312a of one panel arrangement and the bottom header 312b of an adjacent panel arrangement are fluidically configure for obtaining various interconnected panel arrangements for supplying the working fluid flow therethrough. As shown, the top horizontal header 312a of the first panel arrangement 310a is fluidically coupled and the bottom horizontal header 312b of the intermediate panel arrangement 310c, and so on. Without departing from the scope of the present disclosure, any other connection arrangement between the panel arrangement 310 are possible, such as adjacent panel arrangement 310 are coupled through coupling adjacent top headers 312a or bottom heaters 312b. Further, the bottom header 312b of the first panel arrangement 310a is configured to the evaporator section 200 to receive working fluid therefrom. Furthermore, the top header 312a of the last panel arrangement 310b directs the working fluid to the turbine 150 or heat exchanger 152 for its operation or transfer of heat. Flow of the working fluid from the solar receiver 130 towards the turbine 150 via the panel arrangements of the evaporator section 200 and the panel arrangements 310 of the superheater section 300 defines the working fluid circuit 400 for enabling the flow of the working fluid in the first direction, i.e. from the solar receiver 130 to the turbine 150 (the working fluid circuit 400 path in the first direction: 130-(200-300-(310a-310b-310c-310d))-150).

For power generation from the power plant 100, the working fluid in the working fluid circuit 400 is directed in the first direction. As mentioned earlier, some plants (such as the solar) are subject to frequent startups and shutdowns, and problem arises while every time such power plants are restarted next day. While operating during daytime, the panel arrangements 310 of the superheater section 300, reach to its maximum temperature, and during the shutdown period it loses heat, and reaches at relatively lower or higher residual temperature than that required for starting up the power plant 100 in the morning. Specifically, the tubes 314 in the panel arrangements 310 reach ambient temperatures as they lose heat to ambient air, and the headers, such as 312a,b or manifolds which are generally insulated and thick may not lose heat to ambient air. Therefore, during shutdown, such headers or manifolds are at relative lower or higher residual temperature than required for startup, and are generally at higher temperature as compared to the ambient temperature tubes during shutdown. During daytime, while normal operation of the power plant 100, the temperature of the working fluid and the panel arrangements 310 of the superheater section 300 gradually increase from the superheater inlet component sections 310a (upstream section or upstream components) to the superheater outlet component sections 310b (downstream section; downstream components), keeping the downstream components, such as the headers 312a, 312b of the panels 310b, 310d, at relatively higher temperature and the upstream components, such as the headers 312a, 312b of the panels 310a, 310c, at relatively lower. Therefore, even after losing some heat during a shutdown period, the upstream components 310a, 310c remain at relatively lower residual temperature as compared to the downstream components 310b, 310d. At such condition, starting up of the power plant 100 without any preparation may lead various problems as discussed earlier. Therefore, the power plant, such as 100, requires pre-startup preparation, wherein the upstream components need to be heated and the downstream components need to be cooled. Further, the power plant such as 100 also requires post-shutdown preparation which also helps in bringing the temperature of the headers 312a, 312b or manifolds to desired temperature value.

For doing so, an auxiliary fluid circuit 500 is introduced in the system 1000. The auxiliary fluid circuit 500 is capable of enabling an auxiliary fluid flow for a predetermined time and at predetermined parameters in a second direction, opposite to the first direction, through the superheater panel arrangements 310, former to activation of the working fluid circuit 400. In one embodiment, the predetermined parameters are a variable of at least one of a predetermined temperature, a predetermined pressure and a predetermined flow rate of the auxiliary fluid. The predetermined parameters of the auxiliary fluid flow may be such that such parameters may be capable of attaining desired temperature distribution along the superheater panel arrangements 310 to minimize thermal stress thereon. Further, such parameter may also be varied while the operation for attaining desired temperature distribution along the superheater panel arrangements 310 to minimize thermal stress thereon. At least one control device 180 may be incorporated in the system 1000 to control the parameters of the auxiliary fluid flow. The superheater section 300 may be isolated, using isolation arrangements 182, for example isolation valves, from the evaporator section 200 and from the at least one of the turbine 150 and the heat exchanger 152, to avoid any flow of the auxiliary fluid therein. The parameters of the auxiliary fluid flow may also be gradually varied to optimize the post-shutdown and pre-startup preparations of power plant 100.

Specifically, the auxiliary fluid is being supplied from the downstream components, such as from one of the top or bottom header 312a, 312b of the superheater panel arrangements 310b to the upstream components, such as one of the top or bottom header 312a, 312b of the superheater panel arrangements 310a, 310c, for the time and at the temperature, pressure and flow rate, till the required temperature at the downstream components 310b, 310d and at the upstream components 310a, 310c of the superheater section 300 are achieved for starting up the power plant 100 (the auxiliary fluid circuit 500 path in the second direction: enter-310b-310d-310c-310a-exit).

Former to activation of the working fluid circuit 400 for starting up the power plant 100, the predetermined temperature of the auxiliary fluid flow is higher than or equal to temperature of the downstream components 310b, 310d to heat thereto. As the auxiliary fluid flows from the downstream components 310b, 310d to the upstream components 310a, 310c, it loses heat to heat the downstream components 310b, 310d to the upstream components 310a, and 310c, as pre-startup preparation of the power plant 100. Specifically, when the auxiliary fluid is supplied in the second direction, it flows from the downstream components 310b, 310d of the superheater section 300 towards the upstream components 310a, 310c. In one embodiment the auxiliary fluid may be steam flow with a specific rate of change of temperature, pressure and flow rate without departing the scope of any other suitable fluid medium. The auxiliary fluid may be produced instantly during requirement of pre-startup preparation and may not require being stored earlier; however, the disclosure intend to include such storage of the auxiliary fluid if at all required.

Similar to activation of pre-startup preparation of the power plant 100, the auxiliary fluid circuit 500 may also be activated after shutting down the power plant 100. Specifically, the auxiliary fluid circuit 500 may be activated for a predetermined time and at a predetermined temperature, pressure and flow rate in the second direction, opposite to the first direction, through the plurality of superheater panel arrangements 310 after cessation of the working fluid circuit 400, as post-shutdown preparation of the power plant 100. This may achieve a desired temperature and pressure on the superheater section 300 after shutdown of the power plant 100. Specifically, after cessation of the working fluid circuit 400 for shutting down operation, the predetermined temperature of the auxiliary fluid flow is lower than or equal to temperature of downstream sections 310b, 310d to of the superheater panel arrangements 310 to cool thereto, as the post-shutdown preparation of the power plant 100.

After the pre-startup and post-shutdown preparations, the auxiliary fluid flow may be drained by a drainage mechanism 184, for example a drain valve, from the superheater section 300 and the auxiliary fluid circuit 500 may be closed by closing valves 186.

Figure 4:
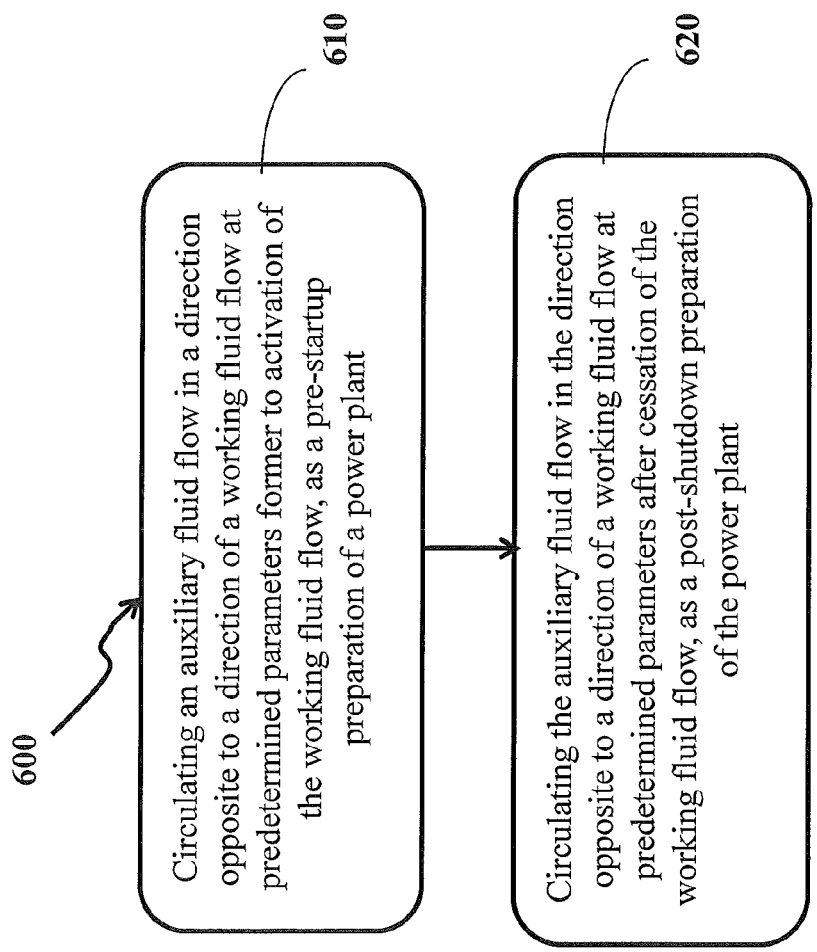
FIG. 4 illustrates a flow diagram depicting a method for pre-startup preparation of a solar operated power plant, in accordance with an exemplary embodiment of the present disclosure.

Referring now to FIG. 4, which illustrates a flow diagram depicting a method 600 for pre-startup and post-shutdown preparation of a solar operated power plant, such as the power plant 100, in accordance with an exemplary embodiment of the present disclosure. At 610, for pre-startup preparation, the auxiliary fluid circuit 500 being activated for the predetermined time former to activation of the working fluid circuit 400. Further, as post-shutdown preparation, the auxiliary fluid circuit 500 being activated for the predetermined time after cessation of the working fluid circuit 400.

In one embodiment, the method 600 and the system 1000 are effective in pre-cooling and pre-heating of the superheater section 300 for effectively achieving the pre-startup and post-shutdown preparations stage, and may be understood from the above explanations.

The pre-startup and post-shutdown preparation system of the present disclosure is advantageous in various scopes. The system and method of the disclosure are capable of balancing the thermal stress and improving the fatigue life of the superheater upstream and downstream components of the superheater to increase overall life of the power plants. Further, the system and method are convenient to use and economical. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated.

It is understood that various omission and substitutions of equivalents are contemplated as circumstance may suggest or render expedient, but such are intended to cover the application or implementation without departing from the spirit or scope of the claims of the present disclosure.

REFERENCE NUMERAL LIST

1000 System for pre-startup or post-shutdown preparation of a power plant
100 Solar operated power plant set-up ('power plant 100')
110 Concentrated solar tower assembly
120 Tower structure
130 Solar receiver
140 Heliostat
150 Turbine
152 Heat Exchanger
160 Economizer
170 Feed water supply
180 Control device
182 Isolation arrangement
184 Drainage mechanism
186 Valves
200 Evaporator section
300 Superheater section
310 Plurality of superheater panel arrangements; Panel arrangements
310a First panel arrangement; Superheater inlet component sections; Upstream section; Upstream components
310b Last panel arrangement; superheater outlet component sections; Downstream section; Downstream components
310c, 310d one or more intermediate panel arrangements
312a, 312b Bottom and top horizontal headers
314 Bundle of parallel vertical tubes
400 Working fluid circuit
500 Auxiliary fluid circuit
600 Method
610-620 Method steps

What is claimed is:

1. A method for at least one of pre-startup preparations and post-shutdown preparations of a solar operated power plant, the solar operated power plant comprising a solar receiver having a superheater section comprising a plurality of superheater panel arrangements, wherein each of the superheater panel arrangements comprises bottom and top headers disposed in a horizontal or sloped manner and connected by a number of vertically disposed heat absorbing tubes, the method comprising:

circulating a working fluid flow in a first direction from an inlet of the superheater section to an outlet of the superheater section; and circulating in a second direction opposite to that of the first direction an auxiliary fluid flow of varying parameters, one parameter being temperature of the auxiliary fluid flow based on process variables of the superheater section, from the outlet of the superheater section to the inlet of the superheater section, the auxiliary fluid flow circulating:

before circulating the working fluid flow, as the pre-startup preparation of the solar operated power plant during which the auxiliary fluid flow is of a temperature higher than a highest temperature of the headers to gradually heat the headers, and after cessation of the working fluid flow, as the post-shutdown preparation of the solar operated power plant during which the auxiliary fluid flow is of a temperature lower than a temperature of the headers to gradually cool the headers.

2. The method of claim 1, wherein the temperature of the auxiliary fluid flow varies for gradual heating or gradual cooling of the headers to minimize thermal stress thereon.

3. The method of claim 1, wherein the varying parameters of the auxiliary fluid flow, further includes parameters of pressure and flow rate of the auxiliary fluid flow entering the superheater section.

4. The method of claim 3, wherein the varying parameters of the auxiliary fluid flow vary for gradual heating or gradual cooling of the headers to minimize thermal stress thereon.

5. The method of claim 1, wherein circulating the auxiliary fluid flow is for a predetermined time period for the pre-startup preparations and post-shutdown preparations to attain a temperature distribution to avoid superheater panel arrangement component thermal stress.

6. The method of claim 1, wherein the auxiliary fluid flow is circulated until the headers in the superheater panel arrangements are cooled to a desired temperature after power plant shut down.

7. The method of claim 6, wherein the desired temperature of the superheater section after power plant shut down is predetermined as are temperatures for the superheater panel arrangements, pre-startup preparations, and temperature gradient of the headers.

8. The method of claim 1, wherein the auxiliary fluid flow is circulated until the headers are heated to a desired temperature for normal operation of the superheater section.

9. The method of claim 8, wherein the desired temperature for normal operation of the superheater section is predetermined as are the temperatures for the superheater panel arrangements, pre-startup preparations, normal operation parameters of the working fluid flow, and temperature gradient of the headers.

10. The method of claim 1, wherein process variables of the superheater section are predetermined as are the temperature of the headers, temperature of pipes fluidly connecting the plurality of superheater panel arrangements and pressure within the superheater section.

* * * * *